July 12, 1927. W. F. ALLEN Re. 16,677

HEATER

Original Filed Feb. 1, 1926

2 Sheets-Sheet 1

WITNESSES

E. A. Wilson

Hugh H. Ott

INVENTOR

WILL F. ALLEN

BY Munn & Co

ATTORNEYS

July 12, 1927. W. F. ALLEN Re. 16,677

HEATER

Original Filed Feb. 1, 1926

2 Sheets-Sheet 2

WITNESSES

E. A. Wilson

Hugh N. Ott

INVENTOR

WILL F. ALLEN

BY Munn & Co.

ATTORNEYS.

Reissued July 12, 1927.

Re. 16,677

UNITED STATES PATENT OFFICE.

WILLIAM F. ALLEN, OF NASHVILLE, TENNESSEE.

HEATER.

Original No. 1,604,869, dated October 26, 1926, Serial No. 85,331, filed February 1, 1926. Application for reissue filed May 18, 1927. Serial No. 192,457.

This invention pertains to heaters and has particular reference to certain improvements in hot air heaters of the type which is designed to be placed in the room to be heated and which includes an inner stove unit and an outer ornamental casing, simulating a piece of furniture, or of cabinet form for housing the inner unit and for creating a circulation of air to be heated between said units. Ordinarily in this type of heaters, the outer casing is kept closed except when firing the same or removing the ashes so that the glow of the fire is hidden from view.

It is, therefore, the prime object of the present invention to so construct the outer casing that the same may, at the option of the user, be opened in such a manner as to expose the glow of the fire without disclosing the unsightly parts which are ordinarily visible when the outer casing of heaters of this type is opened. In other words, the invention comprehends a heater of this character which is constructed in such a manner as to provide an ornamental opening in its outer casing in alinement with the transparent combustion chamber closure or door, which opening is provided with a closure capable of being either opened or closed and which when opened discloses the glow of the fire.

A further important object of the invention resides in the provision of a heater of this character which is so constructed that when the closure in the outer casing is opened the circulation of air generally through the air space between the outer casing and inner stove unit is not materially affected and the heater functions generally in ordinary manner; but passage of air out through the opening in the outer casing is permitted so that local application of heat is effected both by the convection currents passing out through the opening and by radiation, it being understood that the glow of the fire is exposed; and yet the adjacent portions of the inner stove unit and the air space are concealed from view.

The invention further aims to provide an improvement in heaters of the character set forth, which is simple, inexpensive and efficient.

With the above recited and other objects in view, reference is had to the following specification and accompanying drawings in which there is exhibited one example or embodiment of the invention which is in no way intended as a limitation upon the scope of the appended claims as it is to be clearly understood that variations and modifications which properly fall within the scope of said claims may be resorted to when found expedient.

Figure 1:
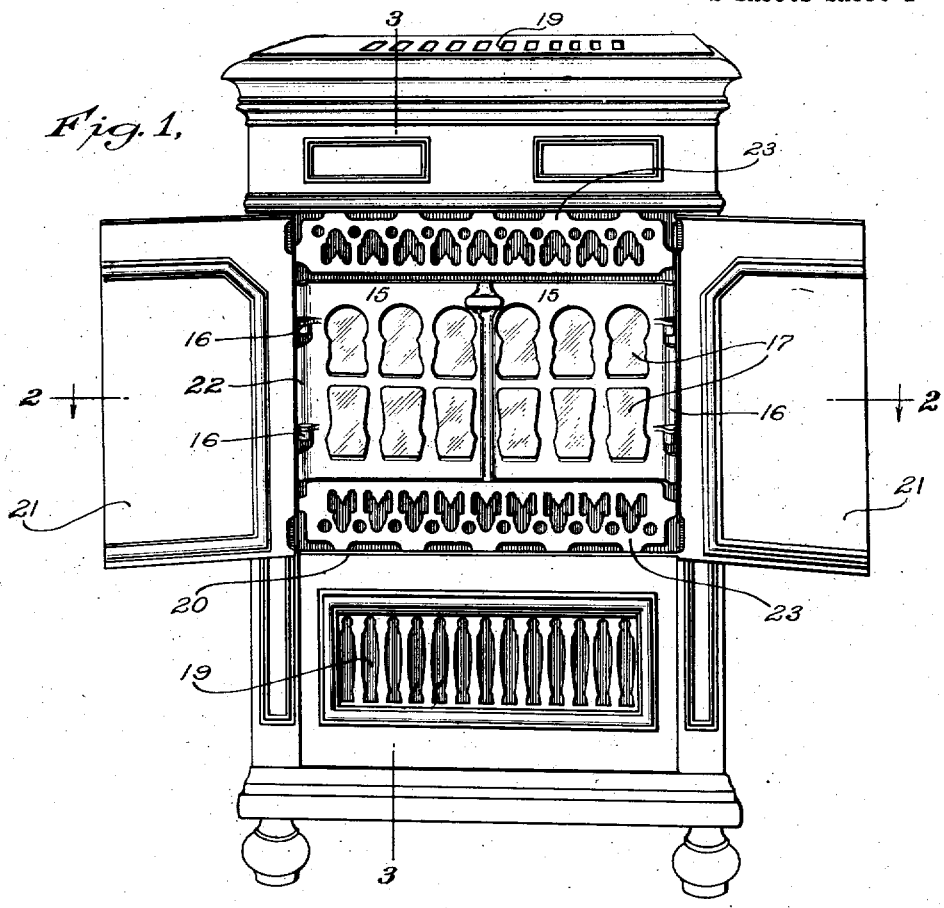
Fig. 1 is a front perspective view of a heater constructed in accordance with the invention and illustrating the closure for the outer casing in opened condition to disclose the glow of the fire.
Figure 2:
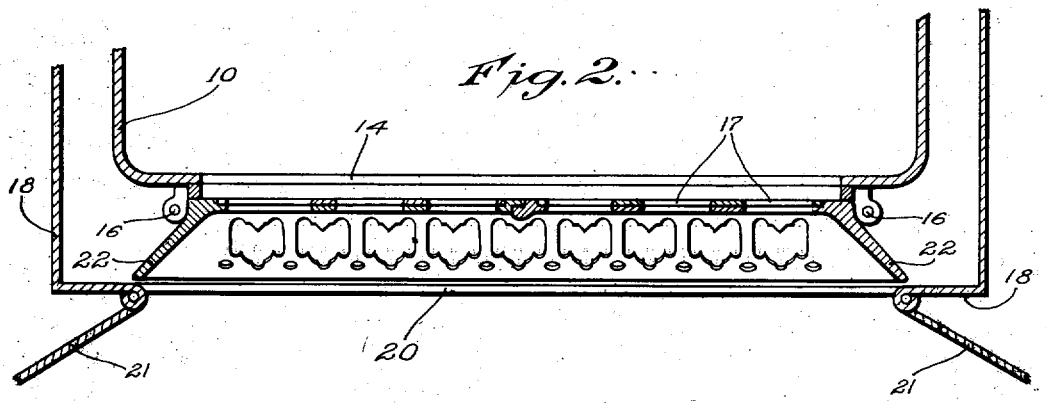
Fig. 2 is an enlarged fragmentary horizontal sectional view therethrough taken approximately on the line indicated at 2—2 in Fig. 1.
Figure 3:
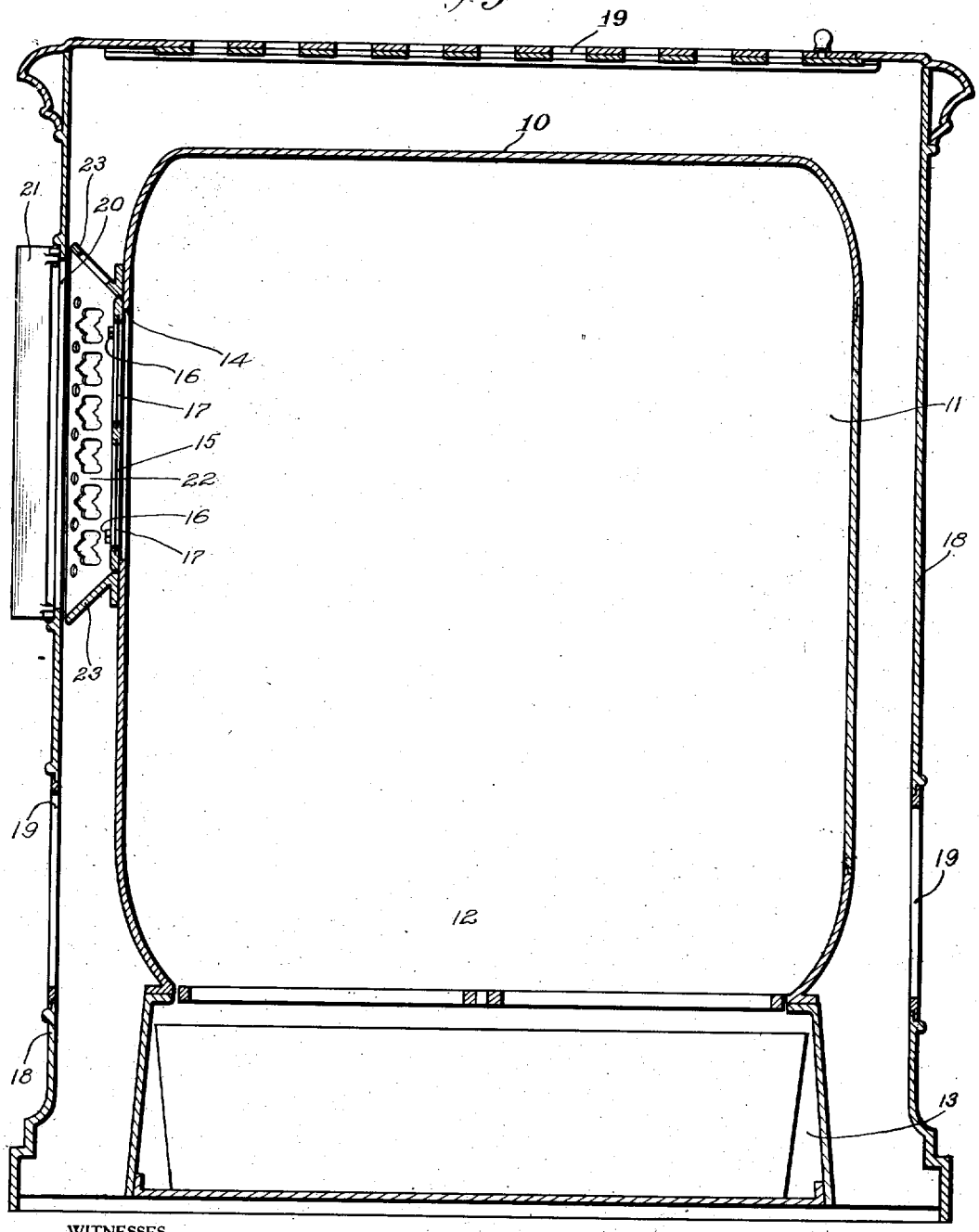
Fig. 3 is an enlarged vertical sectional view therethrough taken approximately on the line 3—3 of Fig. 1.

Referring to the drawings by characters of reference, 10 designates an inner stove unit which includes a combustion chamber 11, a fire box 12, and an ash-pit 13. The combustion chamber 11 is provided with the usual opening 14 for firing the stove or introducing the fuel thereto and is provided with a suitable closure, such as a pair of doors 15, which are hinged as at 16, said door having transparent paneled openings 17 through which the glow of the fire is visible.

In this type of heater, the inner stove unit is covered and concealed by the outer casing or housing 18 suitably spaced therefrom and provided with grille openings or gratings 19 to permit of the natural circulation of air between the inner stove unit and the outer casing so that cold air is drawn into the lower portion, heated and expelled from above. In order to gain access to the closure doors 15 of the inner stove unit, the outer casing is provided with an opening 20 in alinement therewith, which practically consists of a pair of hinged doors 21.

In order to permit of the leaving of the doors in an opened condition to expose the glow of the fire to the occupants of the room in which the heater is arranged, and at the same time, to conceal the unsightly parts of the inner stove unit and the air circulation spaces, the present invention comprehends a means for concealing such unsightly parts which consists in providing the closure doors 15, respectively, at their outer edges with lateral, forwardly-projecting angular extensions or wings 22 extending beyond the hinges 16 to conceal the air-circulation space between the inner and outer units. This means also includes a pair of grille elements or gratings 23 connected, respectively, to the upper and lower edges of the front wall of the outer casing which defines the opening, which grille plates or gratings are of an ornamental nature and extends angularly inward to a point adjacent the upper and lower edges of the closure doors 15. Under this arrangement, it is obvious that the wings 22 and gratings or grille elements 23 conceal the unsightly parts which would ordinarily be visible through the opening 20, while the grille plates or gratings 23 further admit of the circulation of air to be heated which is taken in at the lower portion of the heater and discharges through the lower grille plate 23. The upper grille plate will admit of an intake of air which will be heated and thence expelled through the top grillework or gratings 19.

A heater constructed according to this invention can be used with the doors in the outer casing closed or open, as elected. When the doors are closed the entire inner stove unit is concealed and the heater simulates a piece of furniture. When operated with the doors closed a general heating effect is obtained, convection currents pass upwardly through the air heating space and out at the top of the heater and then the air currents rise and separate to all sides of the stove so that the adjacent room or surrounding space is given a general even heat. When the stove is operated with the outer casing doors open, the glow of the fire is exposed; thus the heater simulates a fireplace and provides the cheer and comfort of an old time fireplace. When the outer doors are open local application of heat is effected; heat is radiated out through the opening and convection currents are permitted to pass out through the opening. At the same time, however, the general flow of convection currents through the air heating chamber is not materially affected.

It is to be noted that the local heating effect is accomplished largely by direct radiation. The use of transparent portions in the inner stove unit permits radiant heat rays from the fire to be directed freely outwardly. These rays of heat pass through the air and warm objects, or an individual upon which they fall, without warming the air through which they pass. In this respect the advantages of a base burner using hard coal, in which transparent portions are customarily used, are obtained. By merely closing the opaque doors the manner in which the heater functions is changed so that general heating is had, as above described, which is after the manner of the so-called "pipeless furnace", and the radiant heat is very substantially cut down.

From the foregoing it will thus be seen that an improvement in heating plants of this character has been devised, which permits the glow of the fire to be observed without disclosing the unsightly parts and without in any way affecting the circulation of the air to be heated.

What is claimed is:

1. A heater including an inner heating unit having a fuel feed opening and a transparent closure, an outer casing unit having an opening alined with the fuel feed opening, an opaque closure for said opening, and means provided respectively at the sides of the fuel feed closure and adjacent the top and bottom of the opening in the outer casing unit for concealing the remainder of the inner unit and the air-circulation spaces between the units when the outer casing closure is opened for the purpose of exposing the glow of the fire.

2. A heater including an inner heating unit having a fuel feed opening and a transparent closure, an outer casing unit having an opening alined with the fuel feed opening, a closure for said opening, and means provided respectively on the sides of the fuel feed opening closure and adjacent the top and bottom of the opening in the outer casing unit for concealing the remainder of the inner unit and the air-circulation spaces between the units when the outer casing closure is opened for the purpose of exposing the glow of the fire, said means consisting respectively of laterally and outwardly extending wings on the fuel feed opening closure and grille elements at the top and bottom of the said outer casing opening.

3. A heater, including an inner heating unit having a fuel opening and a closure, an outer casing spaced therefrom to define an air-circulation space therebetween and having an opening in alinement with the fuel feed opening, a closure for the opening in the outer casing, and means provided respectively on the sides of the fuel feed opening and adjacent the top of the opening in the outer casing for concealing the remainder of the inner unit and the air circulation space when the outer casing closure is opened to expose the glow of the fire, said means consisting respectively of angularly disposed lateral and outer extensions on the fuel-feed opening closure, said extensions having openings permitting of the circulation of air, and inclined grille elements at the top and bottom of said outer casing opening, the said grille elements serving to permit of the circulation of air when the outer casing is opened.

4. A heater including an inner heating unit having a fuel feed opening and a transparent closure and an outer casing unit having an opening alined with the fuel feed opening, a closure for said latter opening, and means located adjacent the fuel feed opening for concealing the air circulation spaces between the units when the outer casing closure is opened for the purpose of exposing the glow of the fire, said means having openings permitting of circulation of air therethrough.

5. A stove comprising in combination, an outer casing of cabinet form, an inner stove unit spaced from the outer casing to provide an air heating space, said outer casing having an opening with an opaque closure for concealing the stove unit from view, the stove unit having a transparent wall portion which is in alinement with the said opening in the outer casing whereby the glow of the fire is exposed when the opaque closures are open and local heating is effected by radiation.

6. A stove comprising in combination an outer casing of cabinet form, an inner stove unit spaced from the outer casing to provide an air heating space, means near the bottom and the top of the outer casing for permitting convection currents to enter the air space near the bottom and leave near the top, said outer casing having an opening, an opaque closure for the opening for concealing the inner stove unit from view and for completing the wall of the outer casing which encloses the air space, the stove unit having a wall portion in alinement with the opening in the outer casing which is made up of transparent portions whereby the glow of the fire is exposed when the opaque closure is opened and local heating effect is obtained by radiation.

7. A stove comprising in combination an outer casing of cabinet form, an inner stove unit spaced from the outer casing to provide an air heating space, the outer casing having an opening provided with a closure whereby general heating effect is obtained by convection currents passing through the air heating space when the said closure is closed, the inner stove unit having a wall provided with transparent portions, said transparent portions being in alinement with the opening in the outer casing whereby the glow of the fire is exposed and local heating effect is obtained by direct radiation when the said closure is open, and means adjacent the opening to conceal the air space and adjacent portions of the inner stove unit from view when the closure in the outer casing is open.

8. A stove comprising in combination an outer cabinet-like casing, an inner stove unit spaced from the outer casing to provide an air heating space, said outer casing having an opening with an opaque closure for concealing the stove unit from view, the stove unit having a fuel feed opening in alinement with the opening in the outer casing member, and a closure for the fuel feed opening having transparent portions whereby the glow of the fire is exposed when the outer closure is opened.

9. A stove comprising in combination an outer casing of cabinet form, an inner stove unit spaced from the outer casing to provide an air heating space, means permitting passage of air into the air space near the bottom of the stove through the space and out near the top of the stove whereby general heating is effected by convection currents, said stove unit having a fuel feed opening and said outer casing having an opening in alinement therewith, an opaque closure for the opening in the outer casing which conceals the inner stove unit from view, and a closure for the fuel feed opening, whereby localized heat by radiation may be effected when the closure and the outer casing is opened, said closure for the fuel feed opening having transparent portions which expose the glow of the fire when the said opaque closure and the outer casing is open.

10. A stove comprising an outer casing of cabinet form, an inner stove unit spaced from the outer casing to provide an air heating space, the outer casing having an opening provided with a closure and the stove having a fuel feed opening provided with a closure, and in alinement with the opening of the outer casing, whereby a general heating effect is obtained by convection currents when the outer casing closure is closed, means adjacent some of the edges of the closures for concealing the air space and adjacent portions of the inner stove unit when the outer casing closure is open, said means permitting the passage of convection currents through the opening in the outer casing to effect localized heating immediately adjacent the heater, and the fuel feed closure being transparent whereby local heating is aided by radiation, and means for controlling the flow of the convection currents through the air space.

11. A stove comprising in combination an outer casing which simulates a piece of furniture, said casing having an opening therein, an opaque closure for said opening, an inner stove unit spaced from the outer casing to provide air heating space and which is entirely concealed from view when the opaque closure is closed, said inner stove unit having a fuel feed opening in alinement with the opening in the outer casing, a closure for the fuel feed opening provided with transparent portions whereby the glow of the fire is exposed when the opaque closure in the casing is opened to simulate a fireplace, and means adjacent one or more edges of the openings to conceal the air space and adjacent portions of the inner stove unit from view when the opaque closure is opened.

12. A stove comprising in combination an outer casing which simulates a piece of furniture, said casing having an opening therein, an opaque closure for said opening, an inner stove unit spaced from the outer casing to provide air heating space and which is entirely concealed from view when the opaque closure is closed, said inner stove unit having a fuel feed opening in alinement with the opening in the outer casing, a closure for the fuel feed opening provided with transparent portions whereby the glow of the fire is exposed when the opaque closure in the casing is opened to simulate a fireplace, and means adjacent one or more edges of the openings to conceal the air space and adjacent portions of the inner stove unit from view when the opaque closure is opened, some of said means being in the form of a grille to permit the passage of convection currents therethrough.

13. A cabinet type heater comprising an outer casing of cabinet form having an opening provided with a hinged closure, an inner stove unit having a fuel feed opening in alinement with the opening in the outer casing, a pair of hinged doors for closing the fuel feed opening, each of said doors having a wing arranged to bridge the space between the stove unit and the outer casing when the fuel opening doors are closed to conceal the air space and adjacent portions of the inner stove unit from view when the outer casing doors are open.

14. A cabinet type heater comprising an outer casing of cabinet form having an opening therein with opaque doors, an inner stove unit spaced from the outer casing having a fuel feed opening in alinement with the opening in the outer casing provided with transparent doors, whereby said heater may be used as elected with the opaque doors closed and with the opaque doors open to thus expose the glow of the fire, and partition means adjacent the lower edge and the two side edges of the openings for concealing the air space and adjacent portions of the inner stove unit from view.

WILLIAM F. ALLEN.